United States Patent [19]

Sedlack et al.

[11] Patent Number: 5,335,964
[45] Date of Patent: Aug. 9, 1994

[54] AUTOMOBILE INFANT RESTRAINT SEAT

[75] Inventors: Mark Sedlack, Cuyohoga Falls; Frances Bernart, Homeworth, both of Ohio

[73] Assignee: Century Products Company, Macedonia, Ohio

[21] Appl. No.: 961,004

[22] Filed: Oct. 13, 1992

[51] Int. Cl.⁵ .............................................. B60N 2/28
[52] U.S. Cl. .............................. 297/256.13; 297/328; 297/365; 297/487
[58] Field of Search .............. 297/250, 328, 487, 488, 297/327, 365, 256.13

[56] References Cited

U.S. PATENT DOCUMENTS

| | | |
|---|---|---|
| D. 289,465 | 4/1987 | Wise . |
| D. 294,777 | 3/1988 | Wise et al. . |
| D. 298,388 | 11/1988 | Wise . |
| 2,319,700 | 5/1943 | Miller et al. ............ 297/328 |
| 4,634,175 | 1/1987 | Wise . |
| 4,634,177 | 1/1987 | Meeker . |
| 4,909,574 | 3/1990 | Sedlack . |
| 5,011,221 | 4/1991 | Wise . |
| 5,181,761 | 1/1993 | Meeker ..................... 297/250 |

FOREIGN PATENT DOCUMENTS

855939 12/1960 United Kingdom ................ 297/327

Primary Examiner—James R. Brittain
Attorney, Agent, or Firm—Graham & James

[57] ABSTRACT

A convertible child restrain seat is provided having a seat portion pivotally mounted to a base, the base including a spring biased slide bar having a post, the seat portion having an elongated member having a plurality of catches configured to mate with the post. Each catch corresponds with a different angle of inclination of the seat portion relative to the base. The post is thereby biased towards the catch to secure the seat portion at a selected angle of inclination. The angle can be adjusted by sliding the slide bar away from the catch and pivoting the seat portion between an upright position, a semi reclined position and an inclined position. An adjustable shield is also provided incorporating a cam actuated height adjustor to allow for shield position adjustment relative to the seat portion.

8 Claims, 4 Drawing Sheets

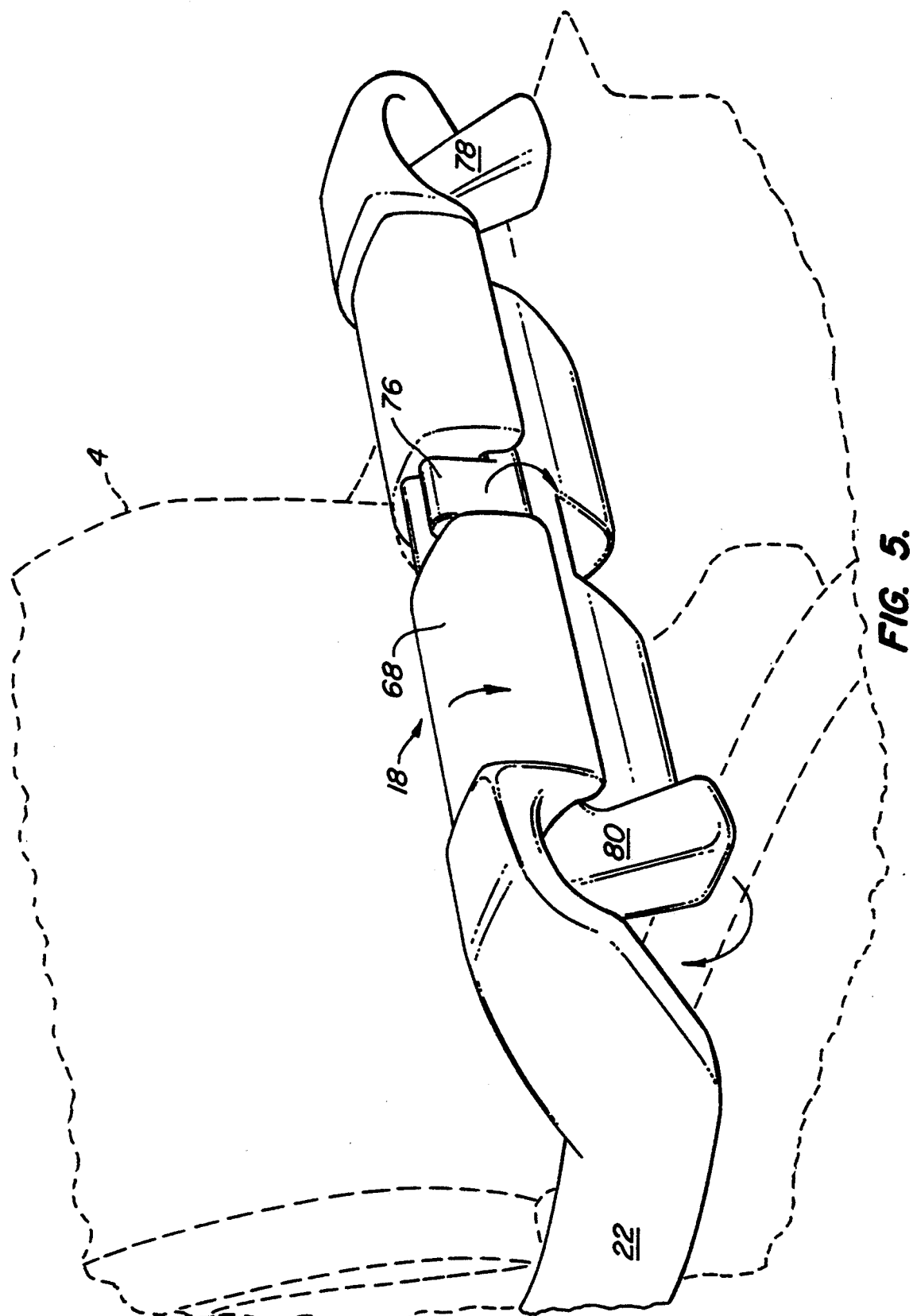

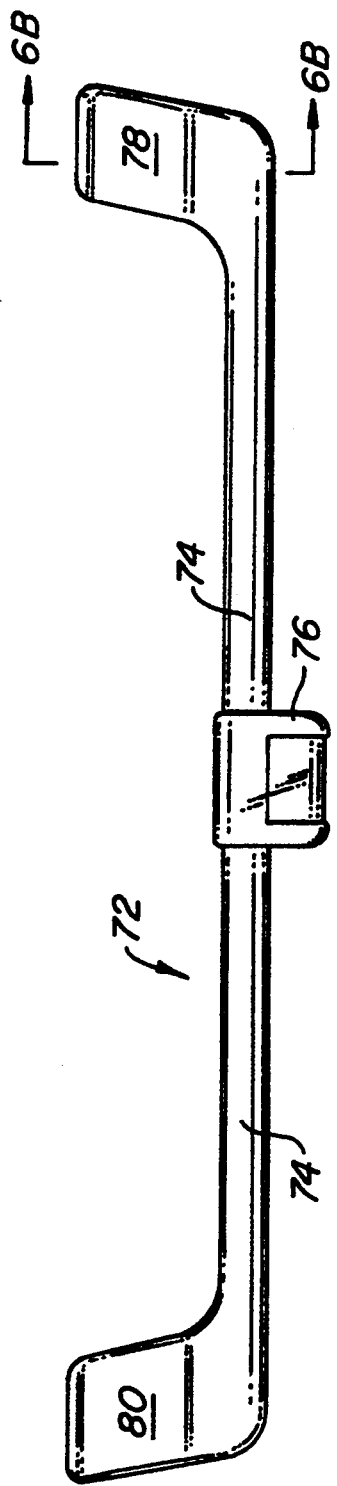
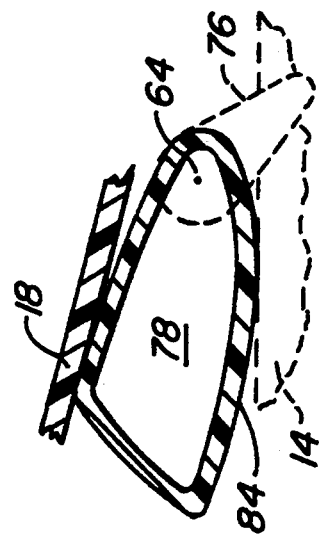
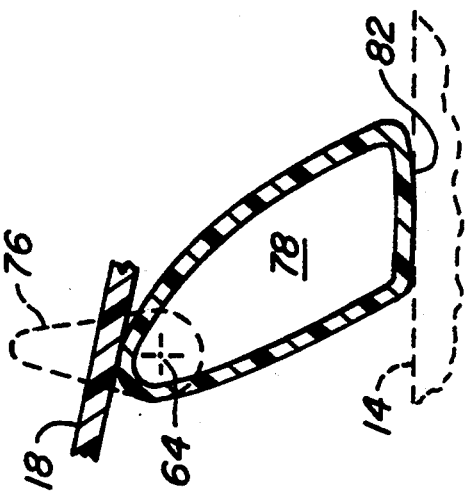

AUTOMOBILE INFANT RESTRAINT SEAT

BACKGROUND OF THE INVENTION

The invention generally relates to an automobile infant restraint seat, and more specifically to an improved convertible child restraint seat having a selectable recline mechanism. In one embodiment of the invention, an adjustable position restraint shield is also provided.

Conventional child restraint seats configured for use in automobiles generally provide an upright, fixed sitting position for the child. It is desirable, however, to be able to alter the angle of inclination of the seating position to provide for more comfortable support for the infant and a greater degree of adjustability for different situations. For example, it may be desirable to allow the infant to be supported by the restraint seat in a reclined position for comfort or to facilitate sleeping when not travelling in an automobile. With conventional fixed position child restraint seats, such an option may be difficult, if not impossible, to achieve without using external supports to prop the seat into the desired position. Multi-position selectability of the angle of inclination can provide enhanced adjustability and flexibility in use when the convertible restraint seat is used both in and outside an automobile.

Furthermore, convertible infant car seats typically employ a shield attachment which pivots to a position in front of the infant to provide a safety barrier for the child's upper body upon impact and adequately confine the infant into the appropriate seat pocket position. The shield also provides a convenient surface to support the child's hands. The shield is typically used in addition to an over-the-shoulder belt system incorporated in the restraint seat. To maximize usefulness, the restraint seat must be designed to carry a wide range of children, from extremely small infants to toddlers. Restraint seats having non-adjustable shields offer no adjustability to adapt to a growing child's increasing size. As a result, the useable life of the restraint seat may be diminished. It is desireable to have an adjustable position shield to accommodate a wide range of child sizes without sacrificing security of the restraint system. An example of a child restraint seat offering a mechanism to provide adjustment of the shield position relative to the seat back can be found in U.S. Pat. No. 4,909,574. The mechanism used, however, employs several parts of complex construction.

SUMMARY OF THE INVENTION

The present invention is a convertible child restraint seat having a slide lock mechanism for adjusting the angle of inclination of the seat portion relative to the base. In one embodiment, the restraint seat also includes an adjustable position shield of simple construction. The child restraint seat includes a seat portion pivotally mounted to a base. The seat portion includes a seat back generally perpendicular to a seat bottom and left and right side walls. Means for releasably securing the inclination angle of the seat portion relative to the base is provided to allow the user to adjust the seat portion in an upright position or an inclined position and can be configured to offer adjustment to several positions inbetween. The user can thereby adjust the inclination of the seat portion to one of a plurality selectable positions to enhance comfort of the child. For example, a more comfortable position for sleeping may be in fully inclined position. Likewise, the fully upright position may be suitable for general travel purposes. Three selectable positions are provided in the preferred embodiment.

The angle adjustment mechanism incorporates a slide bar having a notch and a post extending into the notch in the longitudinal direction of the slide bar. An elongated member is also provided having a guide channel for receiving the post and a plurality of catches in the channel. Each catch corresponds to a different angle of inclination of the seat portion relative to the base. Thus, selective mating of the post with a catch adjusts the angle of inclination of the seat portion relative to the base to a desired position and releasably secures it in that position.

In the preferred embodiment, the slide bar is slidably housed in the base. The elongated member is curved to form a banana clip and is secured to the seat portion and extends into the notch of the slide bar. A resilient member biases the post on the slide bar towards the elongated member to engage the post in a catch. The post can be disengaged from the catch by the user pushing the slide bar against the biasing force moving the post out of the catch. The seat portion can then be rotated to the desired angle of inclination and the post re-engaged with the appropriate catch most closely corresponding to that selected angle of inclination.

An adjustable shield is pivotally mounted to the seat portion and houses a shield adjustment bar. The shield adjustment bar is rotatable in the shield and includes a cam surface at the support points where the shield rests against the seat portion when positioned in front of the child. Rotation of the shield adjustment bar causes the cam surfaces to rotate to thereby raise or lower the shield relative to the seat portion. Ease of rotation is facilitated by a control lever extending out from the shield. The positional adjustment provides adaptability for a wide range of child sizes by varying the distance of the shield from the seat portion.

The invention provides enhanced adjustability and convenience for the user and increased comfort for the child without sacrificing safety. The invention employs a preferred construction which is easy and inexpensive to fabricate and uses few moving parts. These and other features and advantages of the invention will become apparent from the following description in conjunction with the accompanying drawings.

BRIEF DESCRIPTION OF THE DRAWINGS

FIG. 5 is a perspective view of the adjustable shield used in the preferred embodiment of the invention;

FIG. 6A is a top plan view of the shield adjustment bar used in the adjustable shield of FIG. 5;

FIG. 6B is a side cross-sectional view of the shield adjustment bar of FIG. 6A in a first position; and FIG. 6C is a side cross-sectional view of the shield adjustment bar of FIG. 6A in a second position.

DETAILED DESCRIPTION OF THE PREFERRED EMBODIMENTS

Figure 1:
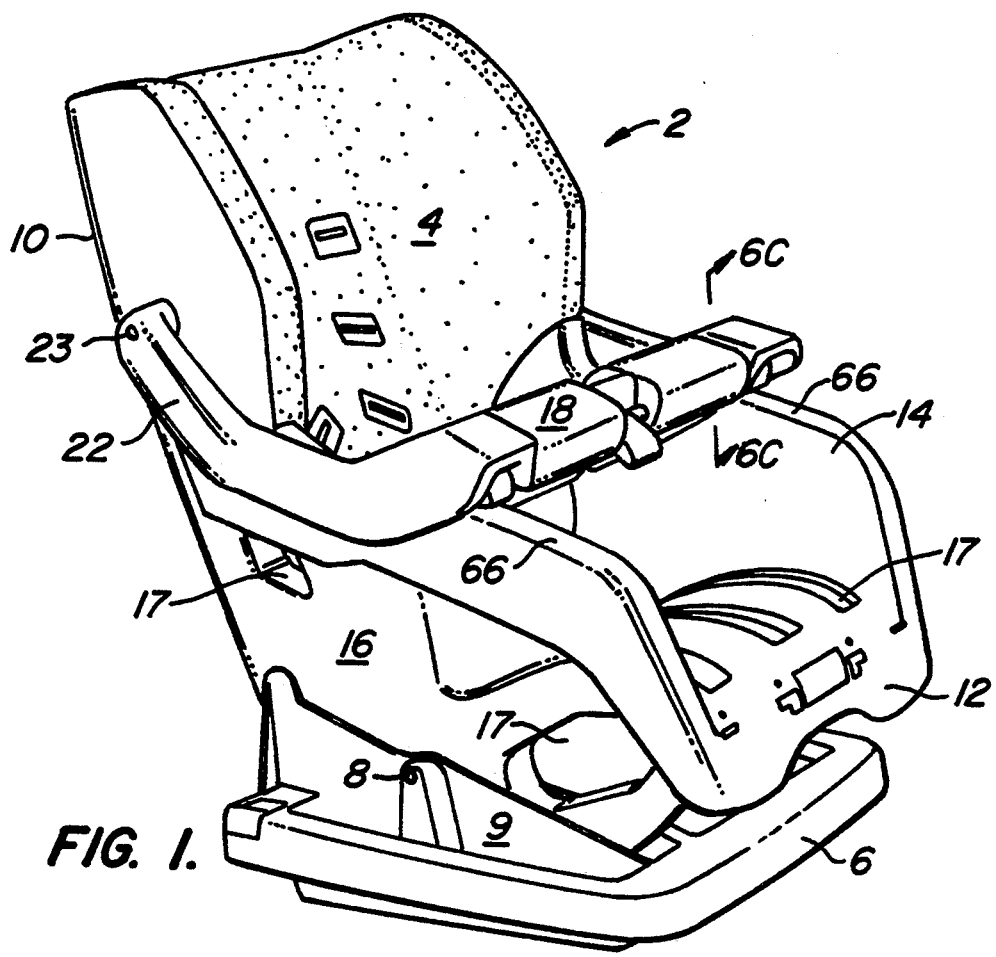
FIG. 1 is a frontal perspective view of the preferred embodiment of the present invention showing the seat in the fully inclined position.

The preferred embodiment of the invention is illustrated in FIG. 1 in perspective view. Convertible child restraint seat 2 is constructed to include seat portion 4 pivotally attached to base 6 at pivot 8. Seat portion 4 is fabricated conventionally having seat back 10 to provide back support for the child, bottom 12 to provide vertical support, and left side wall 14 and right side wall 16 to provide lateral support. Preferably, seat portion 4 is fabricated of plastic or other suitable material using conventional molding techniques. The embodiment illustrated is shown without padded coverings and without a belt restraint system for purposes of clarity. It is intended that child restraint seat 2 be used with appropriate padding, fabric covering and belt restraints as suitable to the particular use contemplated. Child restraint seat 2 is also shown with conventional voids 17 or cavities in the molded structure to decrease weight and reduce material cost but can be fabricated without such voids or in other weight reduction configurations if desired.

Shield 18 is pivotally mounted to seat 4 at side walls 14, 16 with a pair of arms 20, 22. Shield 18 can be pivoted upwardly from the position illustrated in FIG. 1 generally over the top of seat portion 4 to provide clear access to seat portion 4 and allow the child to enter and exit the restraint seat 2. In the down position illustrated in FIG. 1, shield 18 rests against sidewalls 14, 16 of seat portion 4 as will be more fully described below in conjunction with the adjustable shield feature of the invention.

Seat portion 4 is pivotally mounted to base 6 at pivot 8. The pivot axis of pivot 8 is generally perpendicular to the longitudinal axis of seat portion 4 and is disposed across seat bottom 12 in such a fashion as to allow seat portion 4 to pivot smoothly relative to base 6 and thereby vary the angle of inclination of seat back 10 and seat bottom 12 relative to base 6. Base 6 is configured to provide a sturdy support platform and preferably includes upwardly extending walls 9 to partially house the adjacent surfaces of seat portion 4 and base 6 where the two components overlap during pivoting movement. This construction protects from pinching of fingers or of other external objects.

Preferably, pivot 8 is constructed using a metal pivot shaft supported by base 6 and extending across the entire width of seat portion 4. Seat portion 4 is mounted to the shaft to allow the desired pivoting movement. Alternate pivot configurations, such as two or more smaller shafts, bushings or bearing could be used if desired.

Figure 2:
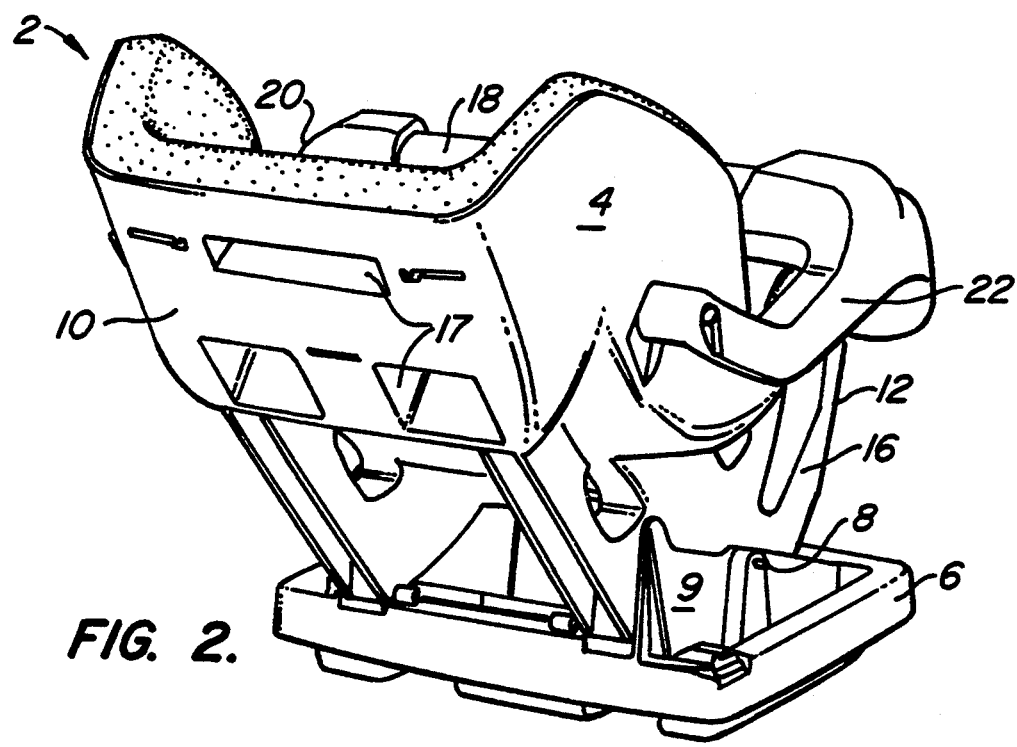
FIG. 2 is a perspective view of the embodiment of FIG. 1 shown from a rearward angle with the seat in a reclined position.

The pivoting relationship between seat portion 4 and base 6 can be seen by comparing FIGS. 1 and 2. FIG. 1 illustrates seat portion 4 in a generally upright position and FIG. 2 illustrates seat portion 4 in a generally reclined position. The relative pivot relationship between seat portion 4 and base 6 is releasably secured by a slide lock mechanism 24.

Figure 3:
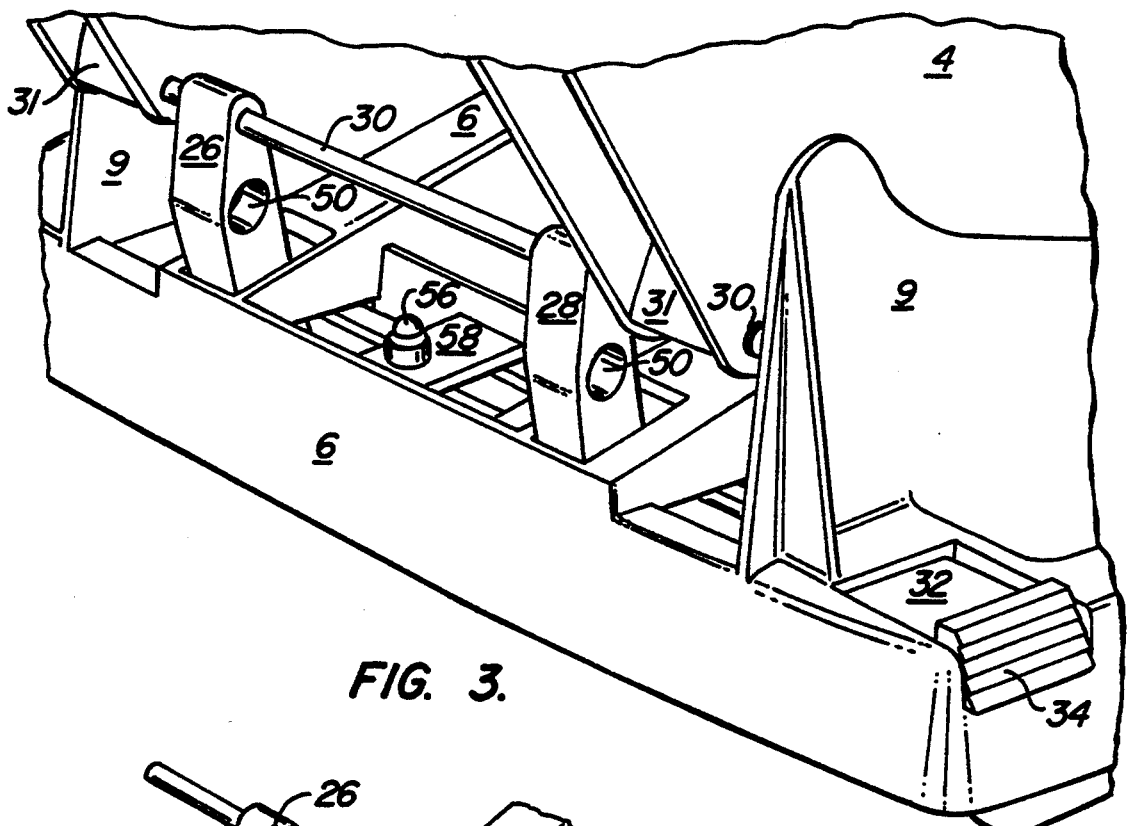
FIG. 3 is a partial view of the preferred embodiment illustrating the selectable slide lock mechanism for adjustment of seat inclination.
Figure 4:
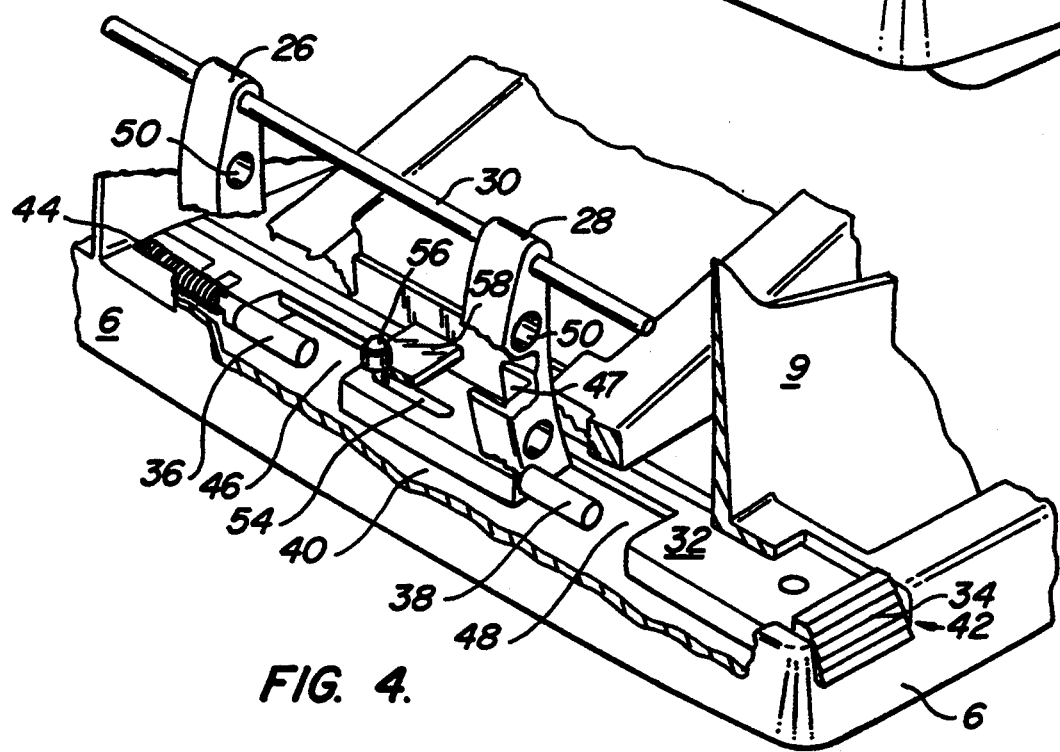
FIG. 4 is a partial cut-away view of the embodiment of FIG. 3.

Slide lock mechanism 24 is best seen in FIGS. 3 and 4. Generally, the mechanism includes catch means 26,28 fixed or coupled to to seat portion 4 and a moveable pin coupled to base 6 which can be releasably engaged with the catch means 26, 28 to secure the pivot position of seat portion 4 relative to base 6. More specifically, the catch mechanism includes a pair of elongated members in the form of banana clips 26, 28 secured to seat portion 4. Clips 26, 28 are connected to seat portion 4 along the outer surface of seat back 10 near seat bottom 12. In the preferred embodiment, two banana clips are used and are secured to seat portion at mounting bar 30. Mounting bar 30 is attached to seat back 10 at supports 31 molded into seat back 10. Mounting bar 30 also extends through clips 26, 28 to thereby couple clips 26, 28 to seat portion 4. Alternative ways of connecting clips 26, 28 to seat portion 4 could also be used if desired. For example, clips 26, 28 could be molded integrally with seat portion 4.

Because banana clips 26, 28 are secured to seat portion 4, and seat portion 4 pivots relative to base 6, clips 26, 28 are curved in shape to conform to the swing arch about the axis of rotation. Each banana clip 26, 28 include a plurality of post catches 50 and guide channel 46 described further below.

Slide bar 32 is slidably disposed in base 6 and includes textured thumb grip 34 at one end. Slide bar 32 also includes a pair of slide posts 36, 38 configured to engage the corresponding clips 26, 28 respectively. Slide bar receptacle 40 is formed in base 6, and has a closed end and an open end 42, with open end 42 positioned at the edge of base 6. Slide bar 32 is positioned in receptacle 40, having thumb grip 34 adjacent open end 42, and is resiliently biased towards open end 42 using suitable resilient means. Preferably, the resilient means is a coil spring 44 disposed at the closed end of slide bar receptacle 40.

Slide bar 32 is notched in configuration to provide a clip channel 46, 48 corresponding to each elongated member or banana clip. Each clip channel is associated with a slide post. Slide posts 36, 38 are made integral with slide bar and extend into clip channels 46, 48, respectively, in the direction of open end 42. Channels 46, 48 are sized to allow banana clips 26, 28 to pass generally transverse to slide posts 36, 38 at the open end side of the posts into base 6 when slide bar 32 is appropriately positioned.

In the preferred embodiment of the invention, post catches are bores through clips 26, 28 and slide posts 36, 38 are cylindrical in shape. Alternative mating configurations could be used. There are three post catches 50 provided on each banana clip 26, 28. One catch 50 in each clip corresponds to one of three selectable positions of seat 4 relative to base 6. Thus, one catch corresponds to an upright position (as illustrated in FIG. 1), a middle catch corresponds to a semi-reclined position and a third catch corresponds to the fully reclined position (illustrated in FIG. 2).

On the side of each banana clip 26, 28 facing the respective slide post 36,38, a guide channel 46 is provided to properly align slide posts 36,38 and banana clips 26 28 together respectively. Preferably, channel 46 is just slightly wider than the width of each post catch to minimize lateral play and provide proper alignment between post and catch engagement.

Slide bar 32 also includes elongated guide slot 54. Guide screw 56 is mounted to base 6 at mounting face 58 and extends into guide slot 54. The sliding engagement between guide screw 56 and guide slot 54 enhances sliding alignment of slide bar 32 in slide bar receptacle 40. Guide slot 54 also defines a stop at each end to limit sliding movement of slide bar 32 in receptacle 40. Thus, the movement of slide bar 32 is laterally contained in receptacle 40 and longitudinally limited in travel by guide slot 54. Longitudinal movement of slide bar 32 towards open end 42 can be restricted so that thumb grip 34 does not extend outside of base 6. This eliminates any potential to snag slide bar 32 on external bodies. Longitudinal movement of slide bar 32 in the opposite direction is also limited to ensure the slide posts 36, 38 always extend at least into clip channel 46. This retains proper alignment between the mating components. Preferably, only one guide screw and guide slot are used as illustrated, however, a multiple screw and slot arrangement could be used as an alternative.

In operation, spring 44 biases slide bar 32 towards open end 42 causing slide posts 36, 38 to each engage a post catch 50 and thereby secure seat portion 4 in the desired position of inclination relative to base 6. Each clip 26, 28 has an equal number of post catches 50, in the form of apertures. As previously described, preferably three pairs of corresponding post catches are provided on the clips 26, 28 to facilitate three selectable positions. Alternatively, two or more than three positions can be accomplished by varying the number of post catches 50 as desired.

To disengage the secured inclined position of seat portion 4, the user depresses thumb grip 34 and slides slide bar 32 into slide bar receptacle 40 towards the closed end. This movement pulls slide posts 36, 38 away from banana clips 26, 28, respectively, thereby disengaging the mating posts and catches. Slide posts 36, 38 remain in clip channels 46 as previously described. Seat portion 4 is, however, free to pivot about pivot shaft 8 and the user can select a new angle of inclination. Posts 36, 38 do not fully retract from clips 26, 28, rather they are retained in their respective clip channel 46 to provide proper alignment as previously described. Upon rotation of seat portion 4 to the desired inclination angle, force applied on slide bar 32 by the user is removed and posts 36, 38 re-engage the appropriate catches 50 to secure seat portion in the new position.

An additional important feature of the invention is an adjustable position shield. Referring now to FIG. 5, shield 18 is shown attached to seat portion 4 illustrated in broken lines for clarity. As previously described, shield 18 is pivotally attached to seat portion 4 by arms 20,22 extending to respective side walls of the seat portion 4. In the down position, shield 18 is positioned in front of the child in the seat and rests against upper surfaces 66 of each side wall 14, 16. Shield 18 includes chest plate 68 configured to provide an appropriate safety barrier in the event of a collision when the child restraint seat is secured in an automobile. Shield 18 also includes shield adjuster bar 72 rotationally housed therein. Shield adjuster bar 72 is best seen in FIG. 6A illustrated in a plan view.

Shield adjuster 72 includes body 74, control lever 76, left end cam 78 and right end cam 80. Body 74 is substantially enclosed in chest plate 68 and is allowed to rotate about axis 64. Cams 78, 80 and lever 76 extend out from chest plate 68 as shown in FIG. 5. Cams 78, 80 are generally cam-shaped as illustrated and of identical cross section and include first face 82 and second face 84. Shield 18 rests against the sides of seat portion 4 as previously described. Shield adjuster bar 72 is configured in length so that left end cam 78 provides the contact surface between shield 18 and left side wall 14. Likewise, right end cam 80 provides the contact surface between shield 18 and right side wall 16.

In the preferred embodiment of the invention, each cam 78, 80 is configured to provide two contact surfaces 82, 84. Greater than two could also be provided. When lever 76 is in the downwardly extending position as illustrated in FIG. 1, cams 78, 80 are abutting the relative side walls of seat along surface 84. Rotation of control lever 76 upwardly rotates body 74 and in turn rotates cams 78, 80 to cause cam surface 82 to abut the relative side walls of seat portion 4. The cam configuration between surfaces 82, 84 thereby displaces chest plate 68 away from sidewalls 14, 16 different distances due to the difference of separation between the outer surfaces of the cam and the axis 64 of rotation of shield adjuster bar 72. The separation by distance of surface 82 from the pivoting axis 64 of body 74 is greater than the same distance measured to face 84. Thus, when lever 76 is rotated up to the position shown in FIG. 6B, shield 18 rests on side walls 16, 18 farther away from seat bottom 12 than when lever 76 is in the down position shown in FIG. 6C. The configuration between faces 82, 84 allows shield adjuster bar to smoothly toggle between the two selectable positions. Thus, when the child is small, it may be desirable to retain shield in the position closest to the baby torso by toggling control lever 76 downwardly as illustrated in FIG. 6C. As the baby grows, or if the seat is used for a larger child, control lever 76 can be toggled to the upward position as illustrated in FIG. 6B thereby pivoting chest plate 68 away from seat portion 4 and providing a larger seat pocket to shield spacing.

Child restraint seat 2 is secured to the automobile using existing automobile seat belts. In the preferred embodiment of the invention, shield 18 is used in conjunction with a suitable three-point child safety belt restraint system to provide adequate restraint safety for the child during impact in conformity with applicable safety regulations. It is not intended that shield 18 be used as the sole restraint mechanism. Further, for safety considerations it is not desireable to adjust the angle of inclination of seat portion 4 or shield 18 position while the automobile is in motion.

Individually, or in combination, the above features of the invention providing for selectable inclination of seat portion 4 relative to base 6 and adjustability of the relative position between the chest shield 68 and seat portion 4 enhances convenience for the user and comfort for the child relative to conventional child restraint seat designs. The invention minimizes moving parts and is easy to manufacture while providing durability and reliability without adversely impacting safety considerations.

The foregoing description of the preferred embodiment of the invention has been presented for purposes of illustration and description. It is not intended to be exhaustive or to limit the invention to the precise form disclosed. Many modifications and variations are possible in light of the above teaching without deviating from the spirit and scope of the invention. For example, the aesthetic configuration of the seat portion 4, the base 6 and the shield 18 can be other than that illustrated.

The embodiment described in this description was selected to best explain the principles of the invention and the preferred mode of practicing the invention to thereby enable others skilled in the art to best utilize the invention in various embodiments and with various modifications as suited to the particular purpose contemplated. It is intended that the scope of the invention be defined by the claims appended hereto.

What is claimed is:
1. A child restraint seat, comprising:
   a base;

a seat portion pivotally mounted to the base along an axis, the seat portion having a bottom, a seat back, a left side wall and a right side wall;

a slide bar, the slide bar including a notch and a post extending into the notch, the post having a free end;

an elongated member spaced apart from the axis and extending into the notch, the elongated member having a guide channel and a first and second catch in said guide channel, the free end of the post captured in the guide channel said guide channel guiding relative movement between the post and the elongated member; and resilient means biasing the post towards the guide channel; wherein sliding movement of the slide bar facilitates selectable mating engagement between the post and the first catch to releasably secure the seat portion at a first angle of inclination relative to the base, and facilitates selectable mating engagement between the post and the second catch to releasably secure the seat portion at a second angle of inclination relative to the base, the first angle of inclination being greater than the second angle of inclination relative to the base.

2. The child restraint seat of claim 1 wherein the seat portion further comprises a backside, wherein the backside faces in a direction generally towards the base and the elongated member is attached to the backside of said seat portion.

3. The child restraint seat of claim 2 wherein the slide bar is slidably disposed in the base.

4. A child restraint seat, comprising:
a base;
a seat portion pivotally mounted to the base along an axis, the seat portion having a bottom, a seat back, a left side wall and a right side wall;
a shield pivotally attached to the seat portion, the shield extending across said left side wall and said right side wall and housing a shield adjustment bar, the shield adjustment bar including a lever extending outwardly from said shield and first and second cam portions, the first cam portion abutting said left side wall and the second cam portion abutting said right side wall, wherein the shield adjustment bar is rotatable between a first adjustment position and a second adjustment position to rotate said first and second cams, wherein said first position positions the shield at a first distance above the left side wall and right side wall and the second adjustment position positions the shield at a second distance above the left side wall and the right side wall, the first distance being less than the second distance.

5. A child restraint seat, comprising:
a base;
a seat portion pivotally mounted to the base along an axis, the seat portion having a bottom, a seat back, a left side wall and a right side wall;
a slide bar, the slide bar including a notch and a post extending into the notch, the post having a free end;
an elongated member spaced apart from the axis and extending into the notch, the elongated member having a guide channel and a first and second catch in said guide channel, the free end of the post positioned in the guide channel to guide relative movement between the post and the elongated member;

resilient means biasing the post towards the guide channel to engage the post in said guide channel; wherein sliding movement of the slide bar facilitates mating engagement between the post and the first notch to releasably secure the seat portion at a first angle of inclination relative to the base, and sliding movement of the slide bar facilitates mating engagement between the post and the second notch to releasably secure the seat portion at a second angle of inclination relative to the base, the first angle of inclination being greater than the second angle of inclination; and a shield pivotally attached to the seat portion, the shield extending across said left side wall and said right side wall and housing a shield adjustment bar, the shield adjustment bar including a lever extending outwardly from said shield and first and second cam portions, the first cam portion abutting said left side wall and the second cam portion abutting said right side wall, wherein the shield adjustment bar is rotatable between a first adjustment position and a second adjustment position to rotate said first and second cams, wherein said first position positions the shield at a first distance above the left side wall and right side wall and the second adjustment position positions the shield at a second distance above the left side wall and the right side wall, the first distance being less than the second distance.

6. A child restraint seat, comprising:
a base;
a seat portion pivotally mounted to the base along an axis and at a predetermined angle of inclination with respect to the base;
an angle adjustment mechanism for varying the angle of inclination, said angle adjustment mechanism having a slide bar lying substantially parallel to said base, said slide bar having at least one notch and at least one post extending substantially parallel to said base and into said notch;
said angle adjustment mechanism having at least one clip slidably disposed to pass through said notch, the clip having a plurality of apertures, the apertures sized to receive said post;
wherein sliding said slide bar in a direction along said axis engages said port in one of said plurality of apertures, to fix and seat portion at said predetermined angle of inclination, and said angle adjustment mechanism can be used to vary said angle of inclination by engaging said post in another of said plurality of apertures.

7. The child restraint seat of claim 6, wherein said slide bar is fixed to said base and said clip is fixed to said seat portion.

8. The child restraint seat of claim 7, further comprising a spring attached to said slide bar, to bias said slide bar along said axis.

* * * * *